(12) United States Patent
Rush et al.

(10) Patent No.: US 7,535,136 B2
(45) Date of Patent: May 19, 2009

(54) PROTECTOR MOUNTING APPARATUS FOR PROTECTOR MOUNTED ON THE WINDINGS OF A MOTOR

(75) Inventors: Eric W. Rush, Manchester, MO (US); David M. Lyle, O'Fallon, MO (US); Dennis R. Howard, Florissant, MO (US)

(73) Assignee: Emerson Electric Co., St. Louis, MO (US)

( * ) Notice: Subject to any disclaimer, the term of this patent is extended or adjusted under 35 U.S.C. 154(b) by 346 days.

(21) Appl. No.: 11/359,063

(22) Filed: Feb. 22, 2006

(65) Prior Publication Data
US 2007/0194654 A1    Aug. 23, 2007

(51) Int. Cl.
*H02K 11/00*    (2006.01)
*H02K 3/46*    (2006.01)
*H01H 71/02*    (2006.01)

(52) U.S. Cl. .................... 310/68 C; 310/68 R; 310/260

(58) Field of Classification Search ............... 310/68 R, 310/68 B, 68 C, 85, 260; 361/23–34
See application file for complete search history.

(56) References Cited

U.S. PATENT DOCUMENTS

| | | | |
|---|---|---|---|
| 2,909,719 A | 10/1959 | Dubberley | |
| 3,131,322 A | 4/1964 | Pleiss, Jr. et al. | |
| 3,200,274 A | 8/1965 | Munier | |
| 3,319,096 A | 5/1967 | Eberhart et al. | |
| 3,842,297 A * | 10/1974 | Pleiss et al. | 310/68 C |
| 3,875,439 A | 4/1975 | Roach | |
| 4,061,935 A | 12/1977 | Kandpal | |
| 4,181,393 A | 1/1980 | Lill | |
| 4,188,553 A * | 2/1980 | Wheaton | 310/68 C |
| 4,236,092 A | 11/1980 | DiFlora | |
| 4,250,419 A * | 2/1981 | Zolman | 310/68 C |
| 4,313,069 A | 1/1982 | Szabo et al. | |
| 4,328,438 A | 5/1982 | Zolman | |
| 4,376,926 A | 3/1983 | Senor | |
| 4,454,493 A | 6/1984 | Ubukata et al. | |
| 4,458,231 A | 7/1984 | Senor | |
| 4,476,452 A | 10/1984 | D'Entremont | |
| 4,656,378 A | 4/1987 | Atherton | |
| 4,734,602 A | 3/1988 | Hauser et al. | |
| 4,866,408 A | 9/1989 | Petraitis et al. | |
| 4,890,025 A | 12/1989 | Hadeler et al. | |
| 4,914,329 A | 4/1990 | Ottersbach | |

(Continued)

FOREIGN PATENT DOCUMENTS

EP    361 394    *    4/1990

OTHER PUBLICATIONS

Texas Instruments, 3MP Self-Hold Motor Protector/Thermal Cut-Out Product Bulletin, Sep. 2002, 2 pages.

*Primary Examiner*—Burton Mullins
(74) *Attorney, Agent, or Firm*—Senniger Powers LLP (57) ABSTRACT

A motor includes a protector electrically connected to the windings and positioned on the coil. A rigid bracket is sized and shaped to receive the protector. A fastening system extends over the coil, bracket and the protector and compresses the bracket against the coil. The bracket inhibits transmission of the compressive force of the fastening system to the protector and thereby shields the protector from damaging force. In another configuration, a sleeve receives the protector, and the fastening system extends only over the sleeve rather than over the protector.

18 Claims, 7 Drawing Sheets

U.S. PATENT DOCUMENTS

| | | |
|---|---|---|
| 4,924,350 A | 5/1990 | Reddy et al. |
| 5,367,282 A | 11/1994 | Clem |
| 5,684,347 A | 11/1997 | Vogt et al. |
| 5,723,922 A * | 3/1998 | Fowlkes ................ 310/68 C |
| 6,005,471 A | 12/1999 | Higashikata et al. |
| 6,223,416 B1 | 5/2001 | Boyd, Jr. |
| 6,244,837 B1 | 6/2001 | Williams |
| 6,433,975 B1 | 8/2002 | Satoh et al. |
| 6,498,560 B2 * | 12/2002 | White et al. ............... 337/104 |
| 6,674,620 B2 | 1/2004 | Lamborghini et al. |
| 6,801,116 B2 | 10/2004 | Oh et al. |
| 7,345,571 B2 * | 3/2008 | Mizuno .................... 337/381 |
| 2004/0114286 A1 | 6/2004 | Sullivan et al. |

* cited by examiner

ID apparatus for mounting a cheaper,
PROTECTOR MOUNTING APPARATUS FOR PROTECTOR MOUNTED ON THE WINDINGS OF A MOTOR This invention relates to a motor having a thermal and/or current sensing protector for protecting the motor from damage, and more particularly to apparatus for attaching such a protector on the windings of the motor.

BACKGROUND OF THE INVENTION

An electric motor often includes a protector capable of shutting down the motor before it is damaged due to an abnormality such as excessive heat. A typical protector is electrically connected to the winding and is adapted to break the current through the winding when the protector senses excessive temperature and/or current in the winding.

Protectors may be "on-winding" protectors, which are mounted directly on the windings, or "off-winding" protectors, which are mounted in a position remote from the windings. It is often beneficial to use on-winding protectors so that the thermal sensor is more responsive to changes in temperature in the windings. By measuring the temperature at the windings, e.g., without a significant gap between the windings and the sensor, the protector can respond more quickly to break current when the windings overheat.

A major disadvantage of many on-winding protectors is simply the added cost. For example, the on-winding protectors are more expensive because they must be more robust to withstand the stress of being mounted on the windings. On-winding protectors are typically formed with housings that are rigid enough to allow the protector to be "strapped" to the windings, e.g., the protector is fastened to the windings by lacing or straps. The robust housing of the on-winding protector is designed to prevent the lacing from bending or otherwise damaging the sensor or sensors inside the housing. In contrast, off-winding protectors are not as robust, and can therefore be made significantly cheaper than on-winding protectors.

Accordingly, it is known in the prior art to mount on-winding protectors directly on the windings using lacing or straps over the protector. It is also known to alter the pattern of lacing or straps (referred to in the lacing art as "controlling the dwell of the lacing") so that they do not extend directly over the on-winding protector. However, the prior art solutions fail to create an economical apparatus for mounting a cheaper, off-winding protector directly on the windings.

SUMMARY OF THE INVENTION

In one aspect, a motor comprises a stator including slots and windings extending through the slots on the stator. The windings include end turns that extend from the slots and form a coil. A protector is electrically connected to the windings and is positioned on the coil. A rigid bracket is sized and shaped to receive the protector. A fastening system extends over the coil, bracket and the protector and compresses the bracket against the coil. The bracket inhibits transmission of the compressive force of the fastening system to the protector and thereby shields the protector from damaging force.

In another aspect, the motor comprises windings that include wire extending from the slots on the stator. The fastening system extends over the coil so as to compress the coil. The protector is disposed in a gap in the fastening system so that the fastening system does not extend over the top of the protector. The protector includes a housing that is incapable of withstanding compression by the fastening system. A sleeve receives the protector, and at least a portion of the sleeve is disposed between the protector and the coil. The sleeve has sufficient length so that the fastening system extends over the sleeve but not over the protector to thereby inhibit transmission of the compressive force of the system to the protector.

BRIEF DESCRIPTION OF THE DRAWINGS

Corresponding reference characters indicate corresponding parts throughout the drawings.

DETAILED DESCRIPTION

Figure 1:
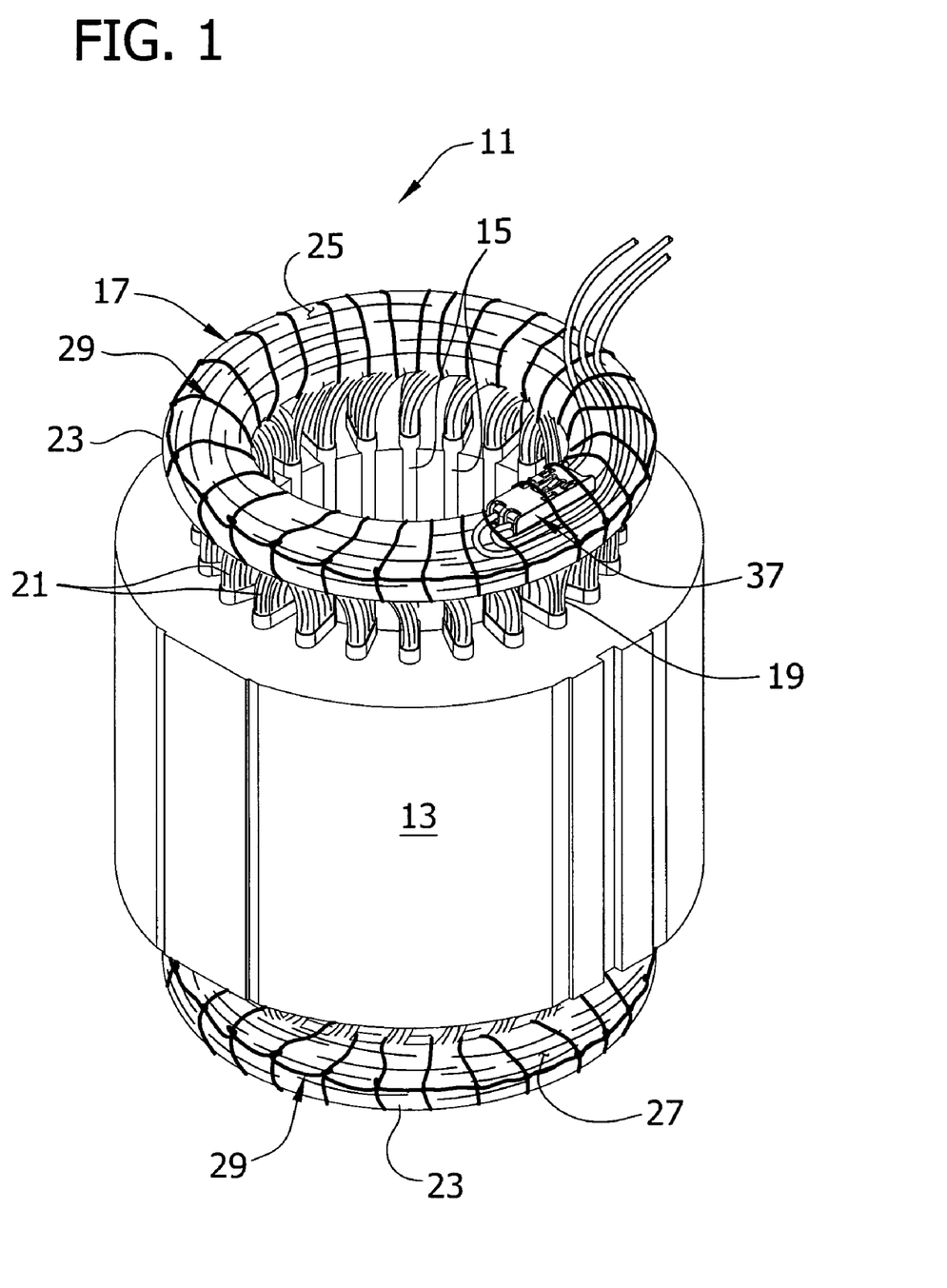
FIG. 1 is a perspective of a portion of a motor of one embodiment.
Figure 2:
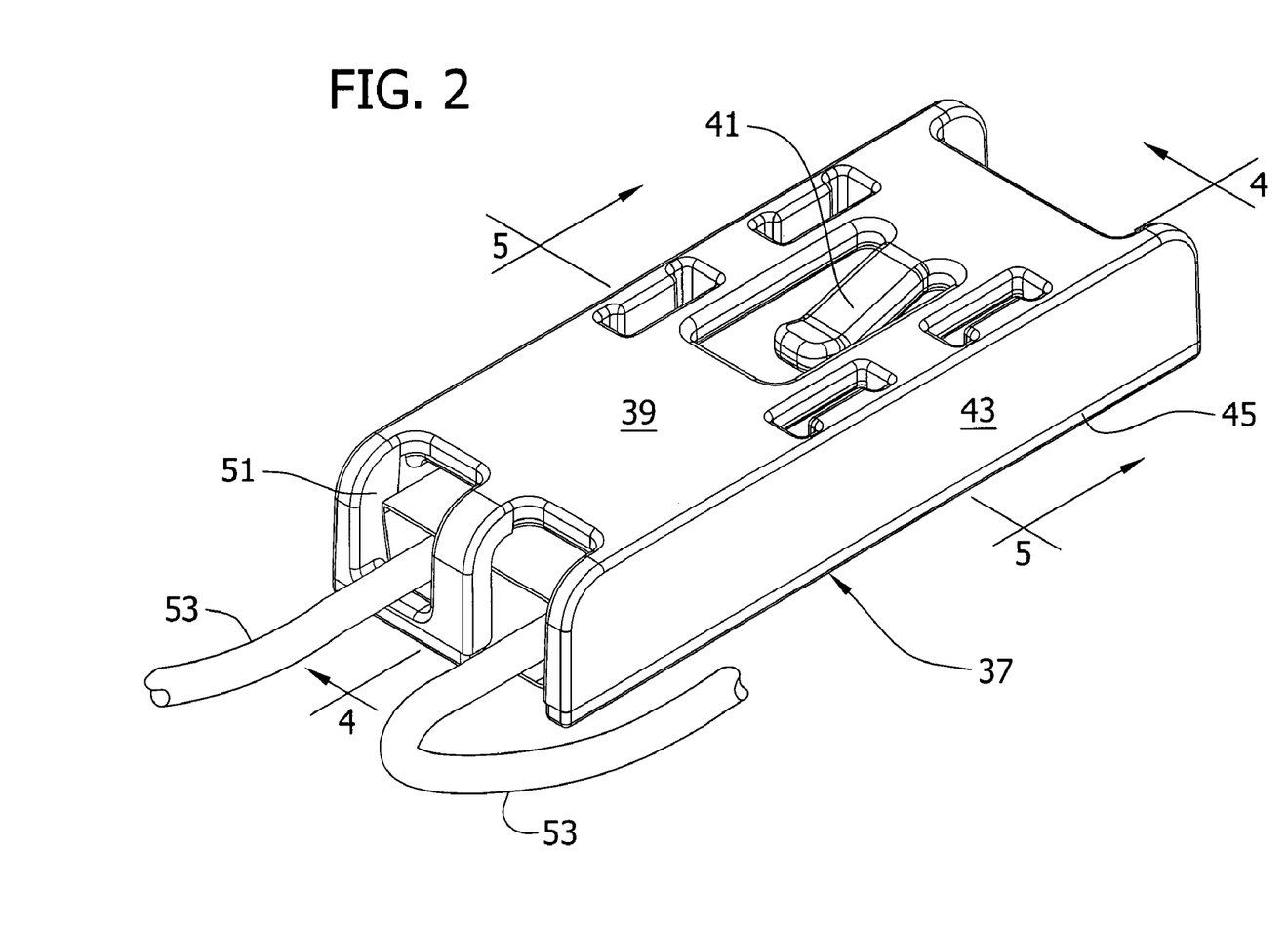
FIG. 2 is a perspective of a bracket and protector used with the motor of FIG. 1.

Referring to FIG. 1, a motor of one embodiment of the invention is generally designated 11. The motor generally includes a stator 13 including slots 15, and windings 17 comprising wire 19 extending through the slots. The windings 17 include end turns 21 extending from the slots 15. The end turns 21 form a coil 23 on each side of the stator 13. Each coil 23 has a top or axial end 25 and a radially facing side 27. It is understood that orientation terms such as "top" and the like used herein refer only to the orientation as depicted in the drawings and are not meant to be limiting in any way. A fastening system 29, which may include lacing, cable ties, straps, or any combination thereof, is used to hold the coil together. The fastening system 29 of this embodiment includes lacing extending over each coil 23 and between the winding wire 19 extending from the slots 15. For clarity, the rotor and housing are omitted; many different types of rotors and housings are suitable for use with this invention. More generally, it should be understood that a variety of motor configurations can be used within the scope of this invention.

Figure 3:
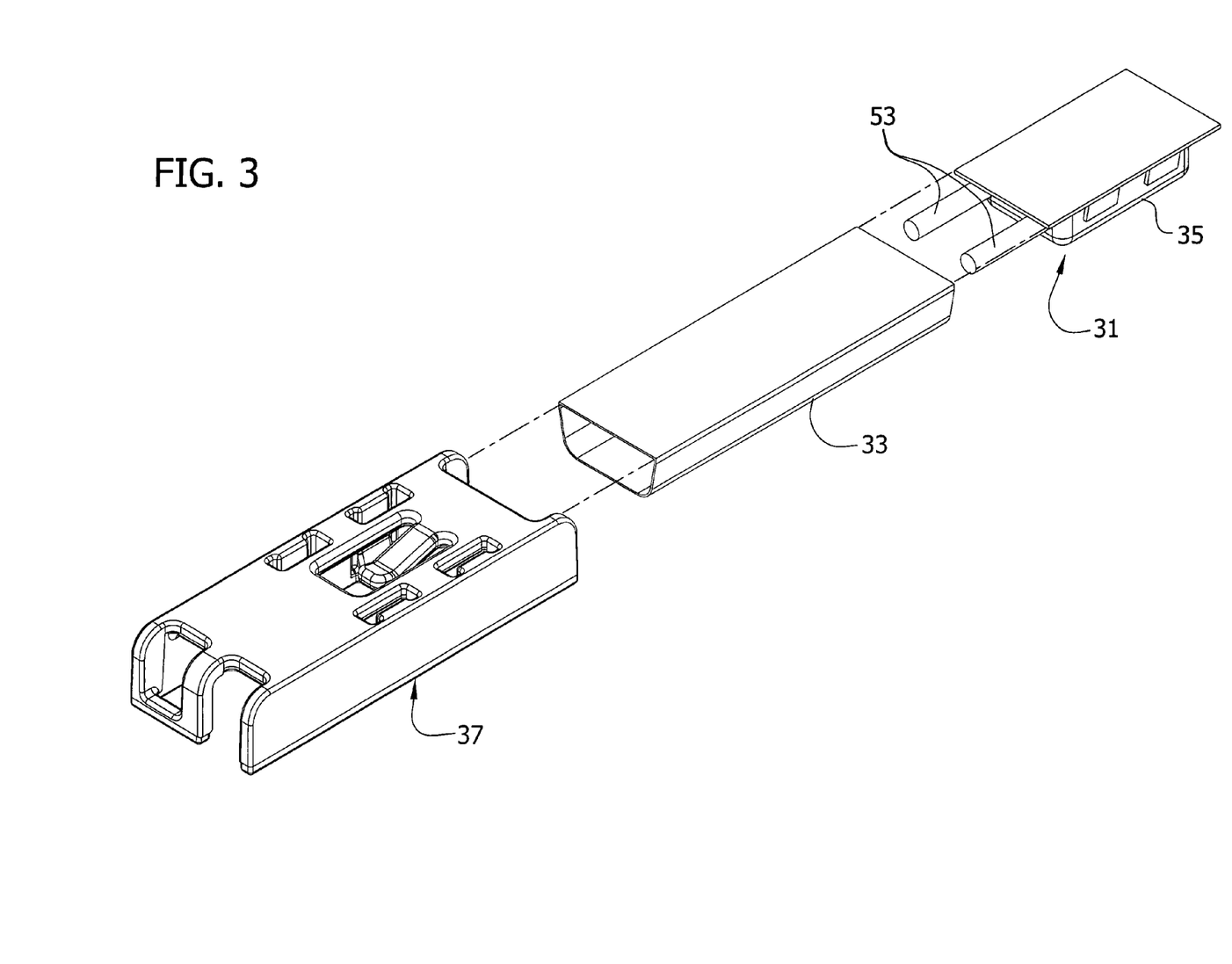
FIG. 3 is an exploded view of the bracket and protector.

Referring now to FIGS. 1-6, the motor includes a protector 31 (FIG. 3) mounted on the windings 17. As shown, the protector 31 is mounted on the top, or the axial end 25, of one of the coils 23 but may be mounted elsewhere on the coil or windings. In one embodiment, the protector 31 is of the type that senses both current and temperature and is adapted to cut power to the motor 11 in response to excessive heat or a current abnormality. However, it is contemplated that the protector 31 only senses either temperature or current. As shown in FIG. 3, an insulating sleeve 33 is disposed around the protector 31 for electrical insulation. The sleeve of this embodiment is made of a material, e.g., mylar, that minimizes any thermal insulation so that the protector can better sense heat from the coil.

The protector 31 is, in general, not capable of withstanding the compressive force of the fastening system 29. Such protectors are sometimes referred to as "off-winding protectors" and are generally not designed by the manufacture for mounting on the windings. Examples of such protectors include those designated "3MP" and sold by Texas Instruments, though there are many other protectors contemplated for use with this invention. A housing 35 of the protector 31 is not rigid enough to prevent damage to the sensor(s) under the compressive force of the fastening system 29.

Figure 4:
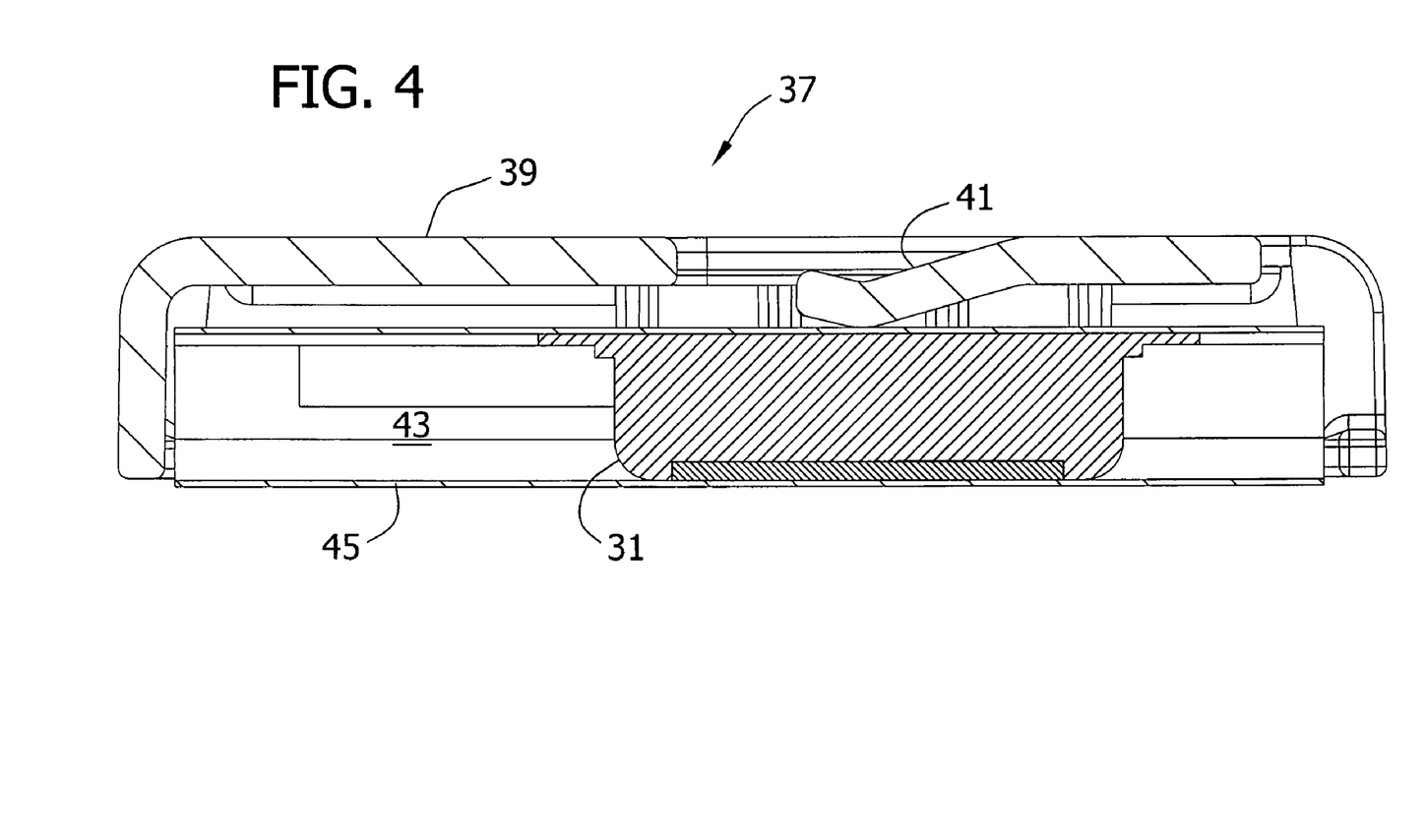
FIGS. 4 and 5 section views taken along lines 4-4 and 5-5, respectively, in FIG. 2.

In one embodiment, the protector 31 is mounted within a rigid bracket 37 on the coil 23 of the windings 17. Generally, the bracket 37 is sized and shaped to retain the protector 31 therein and to shield the protector from damage. As best shown in FIG. 4, the bracket 37 of this embodiment includes an elongate rib 39 that extends over the protector 31. The rib 39 includes a downwardly projecting detent 41 adapted to hold the protector 31 against the coil 23. The detent 41 applies a sufficiently light force to hold the protector 31 against the coil 23, while preventing damage to the sensors inside the protector.

Figure 5:
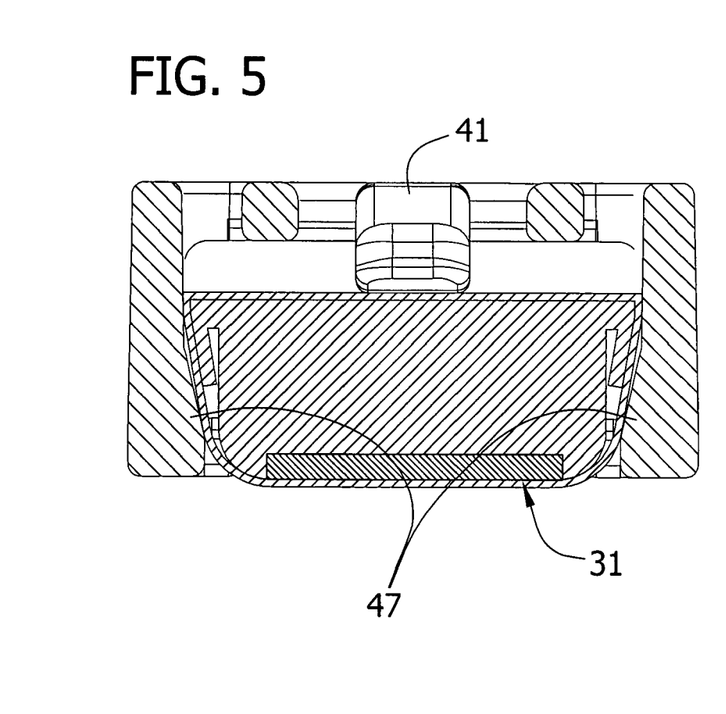
Figure 6:
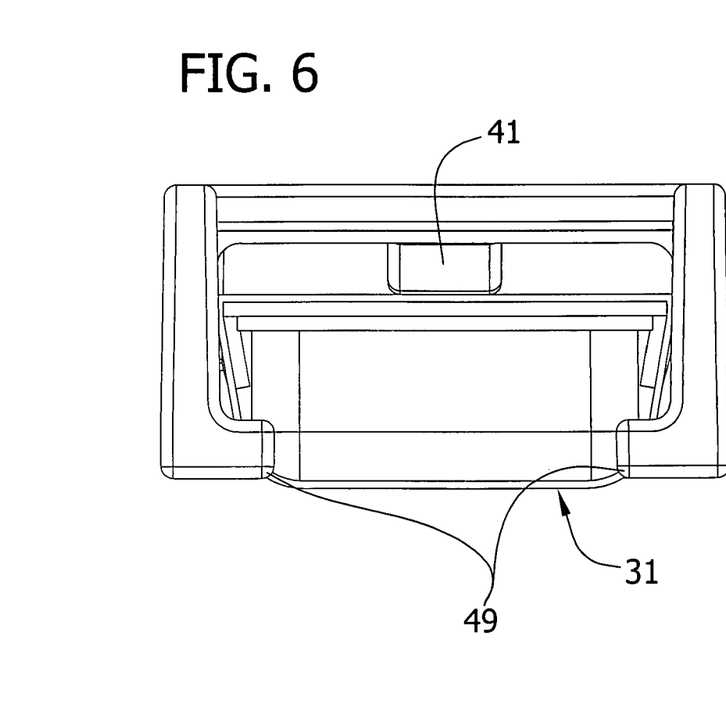
FIG. 6 is an end view of the bracket.

Sidewalls 43 extend downward from both sides of the rib 39 in this embodiment, and lower edges 45 of the sidewalls contact the coil 23. The sidewalls 43 include retention features, and to avoid thermally shielding the protector 31 from the heat of the coil 23, the features do not extend a significant distance under the protector. As best shown in FIGS. 5 and 6, the retention features include shoulders 47 projecting from the sidewalls 43, the shoulders tapering inwardly to correspond to the tapered shape of the protector 31. The retention features also include inwardly extending tabs 49 disposed at one end of the bracket 37. The tabs 49 extend from the lower edges 45 at the one end, but additional tabs or similar features may extend from other portions of the bracket 37. A socket 51 (FIGS. 2 and 3) is formed at the opposite end of the bracket 37 for receiving one of two lead wires 53 that extend from the protector 31. In this embodiment, there is no socket for the other lead wire in case such wire has a large terminal at its end.

As can be seen from the above discussion, the bracket 37 inhibits transmission of the compressive force of the fastening system 29 to the protector 31. The bracket 37 thereby shields the protector 31 so as to prevent damage due to mechanical stress on the protector.

Figure 7:
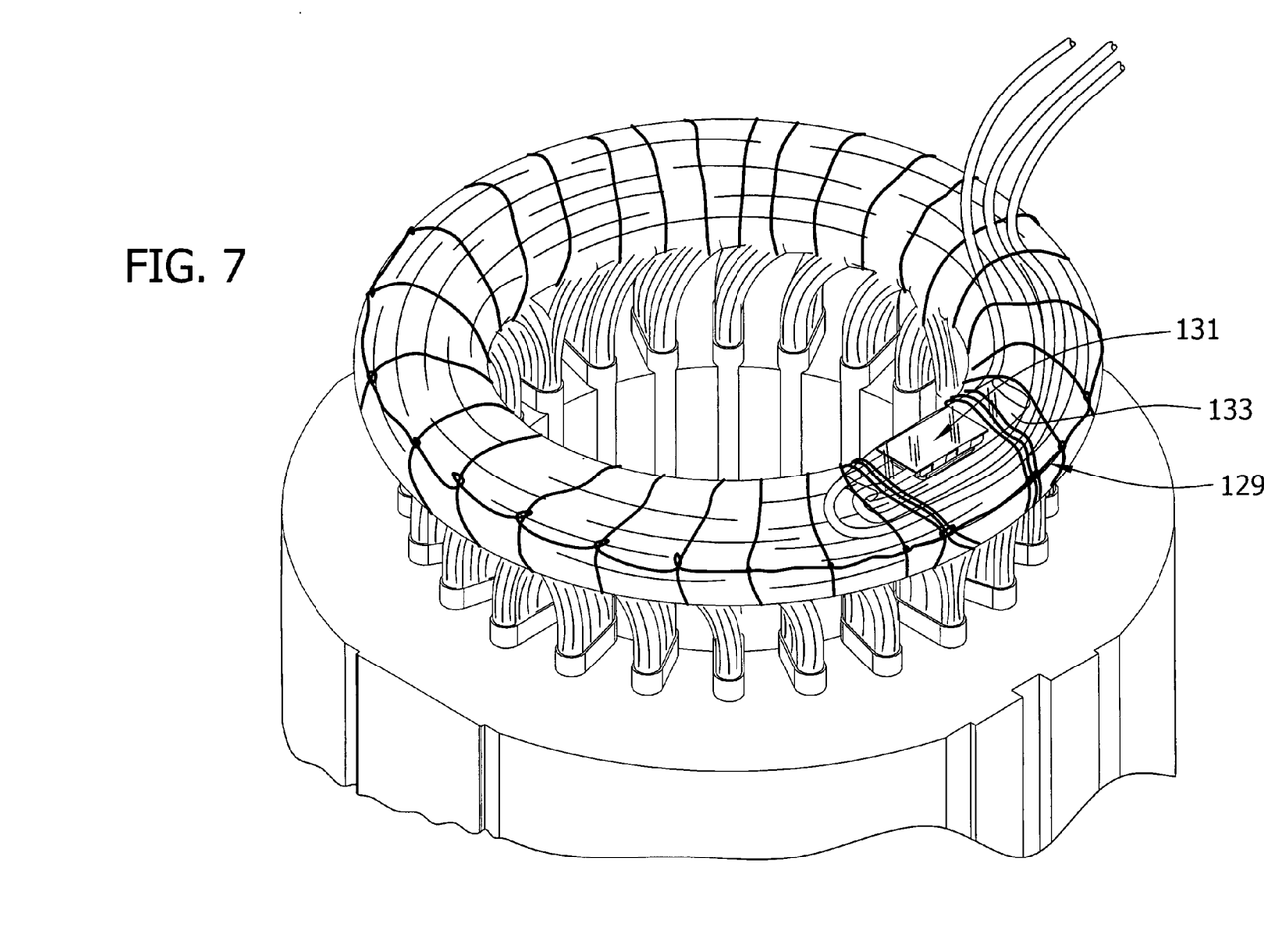
FIG. 7 is a perspective of a portion of a motor of another embodiment.
Figure 8:
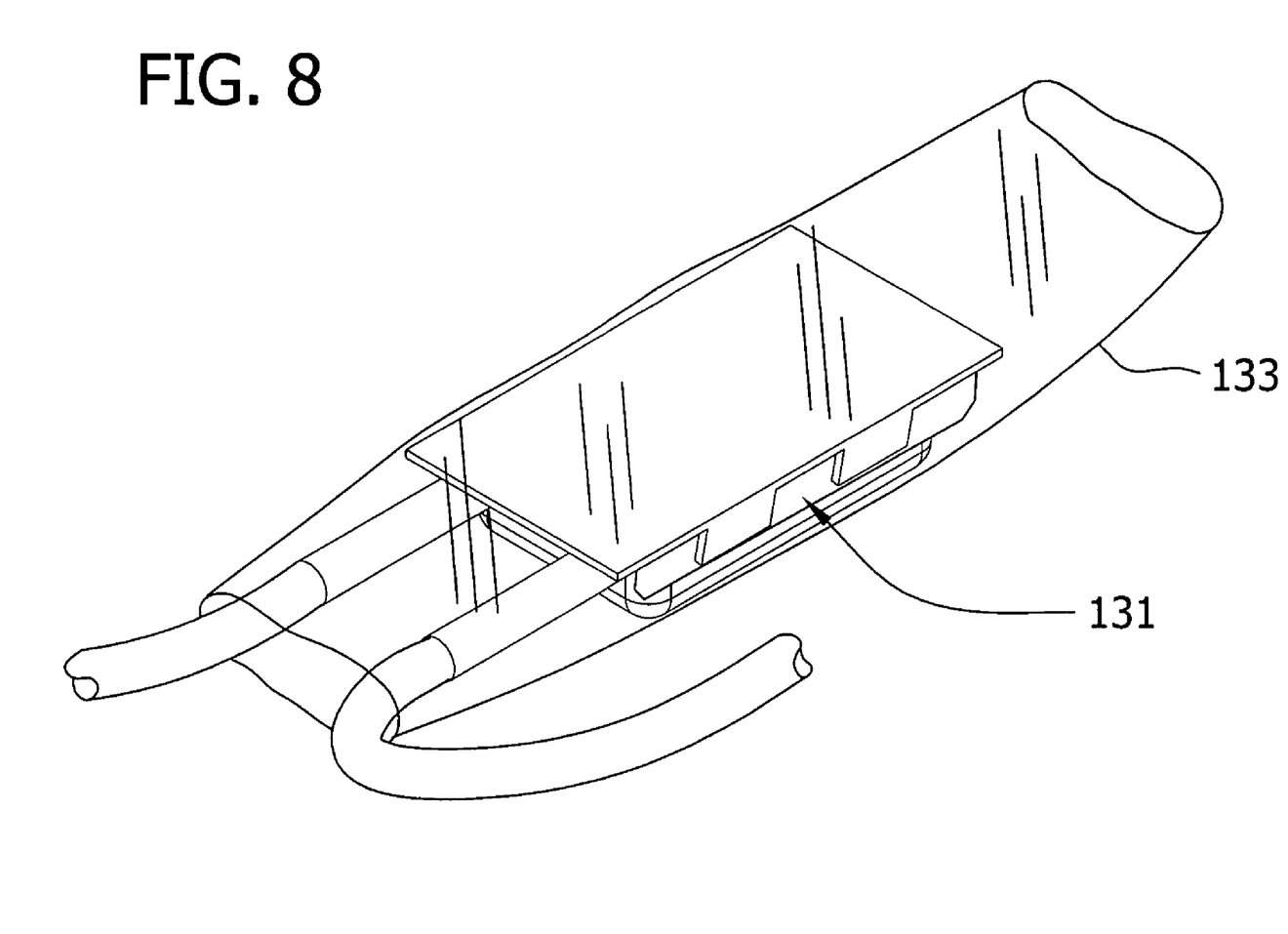
FIG. 8 is a perspective of only the protector and a sleeve around the protector.

Referring now to FIGS. 7-8, a protector 131 of a second embodiment is like the protector 31 described above in that it is not built to be placed on the windings, but in this embodiment it is not enclosed in a bracket. Rather, the protector 131 is disposed in a gap in the fastening system 129 (e.g., the lacing shown in this embodiment) so that the lacing does not extend over the top of the protector. Note that the length of the gap or "dwell" is designed into the lacing pattern and may vary with the size of the protector and sleeve. A modified sleeve 133 is received over the protector 131. The sleeve 133 has sufficient length so that the lacing or other fastener extends over the ends of the sleeve but not over the protector 131, or over terminals extending therefrom. The sleeve 133 thereby inhibits transmission of the compressive force of the fastening system 129 to the protector 131. A standard insulator sleeve provided with the off-the-shelf protector is not of suitable length. Accordingly, the modified sleeve 133 of this embodiment has an extended length so that the lacing can be wound over the ends of the sleeve. As one example, the sleeve may be at least 20% larger than the standard sleeve. In another example, a mylar sleeve provided by a manufacturer for a protector was 37.5 mm, and the modified sleeve was 48 mm or 28% longer than the standard. In this way, the protector 131 is retained on the windings 17 by the fastening system without lacing over the protector itself, or over the terminals extending from the protector.

As can be seen, the fastening system 129 extends between the wire extending from the slots 15 and thus between the slots 15 of the stator. The slots 15 of this embodiment are evenly spaced apart a predetermined length, and the protector is generally disposed above the slots. The sleeve of the protector may extend a distance equivalent to at least one-half the length between slots, or at least one-half to 4 slot lengths, or even 1 to 3 slot lengths beyond each end of the protector so that the lacing can be disposed over each end of the sleeve.

The embodiments of the invention described above reduce the cost of the motor without sacrificing performance. These embodiments enable one to use a less expensive, non-robust protector directly on the windings. The prior art has been significantly limited because such protectors have only been applied to areas remote from the windings, e.g., on the endshield. Indeed, vendors have taught against using these protectors directly on the windings. Thus, the invention is surprisingly effective and significantly reduces the overall cost of the motor.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description and shown in the accompanying drawings shall be interpreted as illustrative and not in a limiting sense.

What is claimed is:

1. A motor comprising:
a stator including slots,
windings extending through the slots on the stator, the windings including end turns extending from the slots and forming a coil,
a fastening system extending over the coil,
a protector electrically connected to the windings and positioned on the coil, and
a rigid bracket receiving the protector, the fastening system extending over the bracket and the protector and compressing the bracket against the coil, the bracket preventing the fastening system from directly contacting the protector, inhibiting transmission of the compressive force of the fastening system to the protector and thereby shielding the protector from damaging force.

2. The motor of claim 1 wherein the bracket includes a rib over the protector and sidewalls extending from the rib and contacting the coil.

3. The motor of claim 2 wherein the bracket includes retention features for retaining the protector within the bracket, the features not extending underneath the protector so as to prevent the bracket from thermally shielding the protector.

4. The motor of claim 2 wherein the sidewalls include inwardly tapered shoulders corresponding to the tapered shape of the protector.

5. The motor of claim 4 wherein the sidewalls include lower edges having inwardly projecting tabs for retaining the protector.

6. The motor of claim 2 wherein the sidewalls include an end having tabs to retain the protector.

7. The motor of claim 1 wherein the bracket includes a rib having a projecting detent adapted to hold the protector against the coil.

8. The motor of claim 7 wherein the rib of the bracket is spaced from the protector by the detent.

9. The motor of claim 1 further comprising at least two lead wires extending from the protector, an end of the bracket including a socket for receiving one of the lead wires.

10. The motor of claim 1 further comprising an electrical insulator between the protector and the coil, the protector being separated from the coil only by the electrical insulator.

11. The motor of claim 10 wherein the protector includes a housing and the insulator is disposed between the housing and the coil, the insulator adapted for electrical insulation and adapted to minimize-thermal insulation.

12. The motor of claim 1 wherein the protector includes a housing, the housing having insufficient rigidity to prevent damage to components within the protector under compressive force from the fastening system.

13. The motor of claim 1 wherein the protector is mounted on an axial end of the coil. fastening system extends over the sleeve but not over the protector, the sleeve thereby inhibiting transmission of the compressive force of the system to the protector.

14. A motor comprising:
a stator including slots,
windings extending through the slots on the stator, the windings including end turns extending from the slots and forming a coil,
a fastening system extending over the coil,
a protector electrically connected to the windings and positioned on the coil, and
a rigid bracket sized and shaped to receive the protector, the fastening system extending over the bracket and the protector and compressing the bracket against the coil, the bracket inhibiting transmission of a compressive force of the fastening system to the protector and thereby shielding the protector from damaging force, wherein the bracket includes a rib having a projecting detent adapted to hold the protector against the coil.

15. The motor of claim 14 wherein the rib of the bracket is spaced from the protector by the detent.

16. A motor comprising:
a stator including slots,
windings extending through the slots on the stator, the windings including end turns extending from the slots and forming a coil,
a fastening system extending over the coil,
a protector electrically connected to the windings and positioned on the coil, and
a rigid bracket sized and shaped to receive the protector, the fastening system extending over the bracket and the protector and compressing the bracket against the coil, the bracket inhibiting transmission of a compressive force of the fastening system to the protector and thereby shielding the protector from damaging force, the bracket including a rib over the protector and sidewalls extending from the rib and contacting the coil, the sidewalls including inwardly tapered shoulders corresponding to a tapered shape of the protector.

17. The motor of claim 16 wherein the sidewalls include lower edges having inwardly projecting tabs for retaining the protector.

18. The motor of claim 16 wherein the sidewalls include an end having tabs to retain the protector.

* * * * *

UNITED STATES PATENT AND TRADEMARK OFFICE
CERTIFICATE OF CORRECTION

| | | |
|---|---|---|
| PATENT NO. | : 7,535,136 B2 | Page 1 of 1 |
| APPLICATION NO. | : 11/359063 | |
| DATED | : May 19, 2009 | |
| INVENTOR(S) | : Rush et al. | |

It is certified that error appears in the above-identified patent and that said Letters Patent is hereby corrected as shown below:

Column 4, Claim 3, Line 45: "bracket includes" should read -- sidewalls include --.

Column 4, Claim 3, Line 47: "features" should read -- retention features --.

Column 4, Claim 3, Lines 47-48: "underneath the protector so as to prevent the bracket from thermally shielding the protector." should read -- between a bottom of the protector and the coil. --.

Column 4, Claim 10, Line 67: "coil only by" should read -- coil by --.

Column 4, Claim 10, Line 67: The following should be inserted at the end of the claim -- and the bracket being arranged so the bracket does not thermally shield the protector from the coil --.

Column 5, Claim 11, Line 4: "minimize-thermal" should read -- minimize thermal --.

Column 5, Claim 13, Lines 10-13: "fastening system extends over the sleeve but not over the protector, the sleeve thereby inhibiting transmission of the compressive force of the system to the protector." should be deleted.

Signed and Sealed this

Thirtieth Day of March, 2010

David J. Kappos
*Director of the United States Patent and Trademark Office*